United States Patent [19]
Bleckmann et al.

[11] Patent Number: 5,207,484
[45] Date of Patent: May 4, 1993

[54] METHOD AND CIRCUIT CONFIGURATION FOR CONTROLLING A BRAKE SYSTEM WITH (ANTI-LOCK CONTROL AND/OR TRACTION) SLIP CONTROL

[76] Inventors: Hans W. Bleckmann, Karlstrasse 17, 6350 Obermoerlen; Helmut Fennel, Schubertstrasse 9, 6232 Bad Soden; Hans Wupper, Eichaeckerstrasse 10A, 6382 Friedrichsdorf; Michael Latarnik, Roemerstrasse 11, 6382 Friedrichsdorf-Seulberg; Alexander Kolbe, Taunusstrasse 38, 6101 Rossdorf, all of Fed. Rep. of Germany

[21] Appl. No.: 549,010
[22] PCT Filed: Jan. 26, 1989
[86] PCT No.: PCT/EP89/00038
    § 371 Date: Sep. 13, 1990
    § 102(e) Date: Sep. 13, 1990
[87] PCT Pub. No.: WO89/08574
    PCT Pub. Date: Sep. 21, 1989

[30] Foreign Application Priority Data
Mar. 18, 1988 [DE] Fed. Rep. of Germany ....... 3809100

[51] Int. Cl.$^5$ .................... B60T 8/50; B60T 8/64
[52] U.S. Cl. .................... 303/110; 303/103; 303/DIG. 4
[58] Field of Search ........... 303/100, 108, 109, 103, 303/110, 93, DIG. 3, DIG. 4

[56] References Cited
U.S. PATENT DOCUMENTS

| | | | |
|---|---|---|---|
| 3,953,083 | 4/1976 | Latvala et al. | 303/103 |
| 3,958,835 | 5/1976 | Rothfusz et al. | 303/103 |
| 4,111,497 | 9/1978 | Carp et al. | 303/110 |
| 4,123,116 | 10/1978 | Carp et al. | 303/DIG. 4 X |
| 4,824,183 | 4/1989 | Uchida et al. | 303/DIG. 4 X |
| 4,900,099 | 2/1990 | Braschel | 303/DIG. 4 |

FOREIGN PATENT DOCUMENTS

| | | |
|---|---|---|
| 2460904 | 1/1976 | Fed. Rep. of Germany . |
| 3639862 | 6/1987 | Fed. Rep. of Germany . |
| 3620386 | 12/1987 | Fed. Rep. of Germany . |

Primary Examiner—Matthew C. Graham
Attorney, Agent, or Firm—Robert P. Seitter; J. Gordon Lewis

[57] ABSTRACT

A brake system with anti-lock and/or traction slip control, wherein quantities ($\Delta t_{EV}$, $\Delta t_{AV}$) determining the pressure in the wheel brakes (10, 11) are measured and assessed. A wheel pressure pattern (p(t)) is formed from these quantities by integration which, by approximation, represents the pressure variation in the wheel brakes (10, 11). The output signal of the integrator (20) is fed back to the control logic (16) and assessed for slip control and/or braking pressure control. For the integration, taken into account are the braking-pressure-increase and braking-pressure-decrease characteristic curves ($P_A$, $P_E$) and the initial conditions (21) which represent the initial pressure upon commencement of the control.

3 Claims, 2 Drawing Sheets

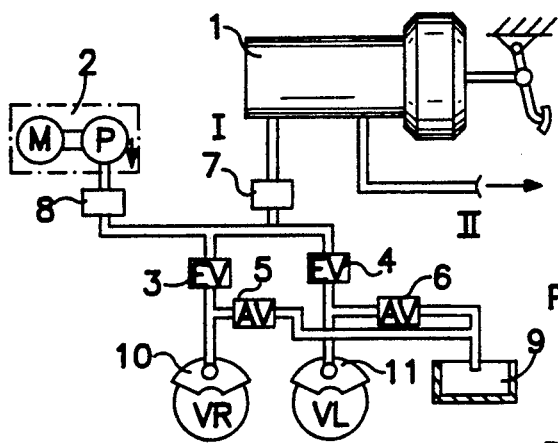
FIG. 1
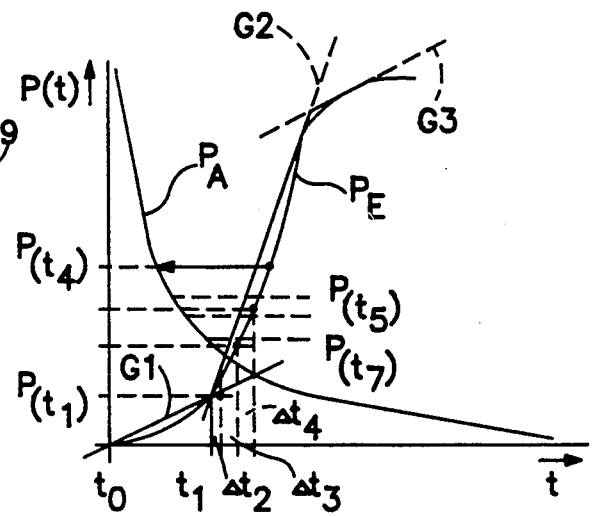
FIG. 2
FIG. 3
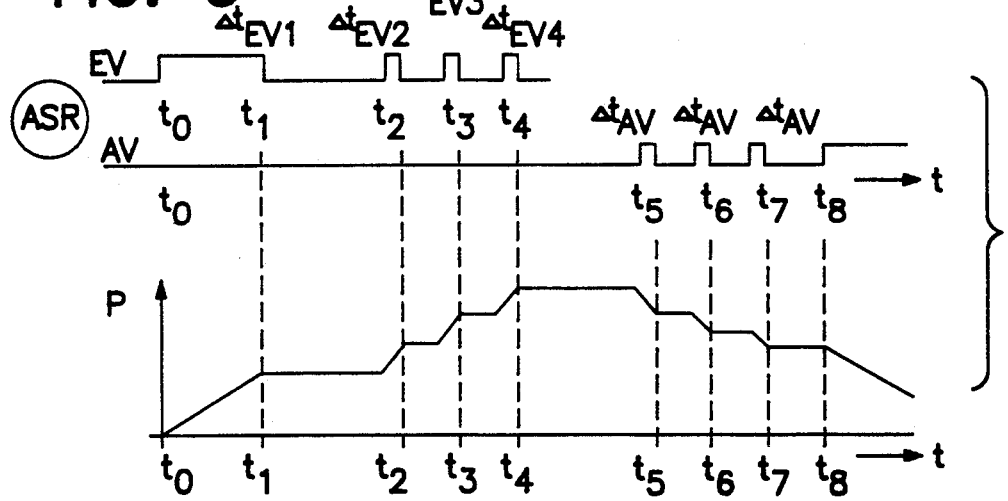
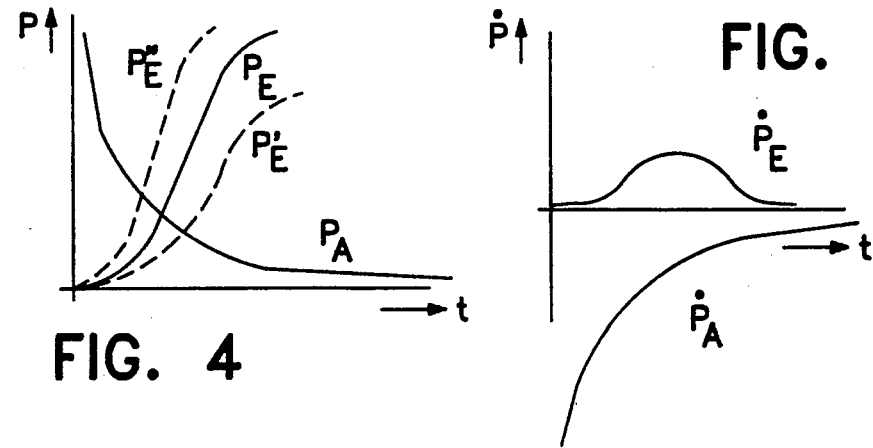
FIG. 4
FIG. 5

METHOD AND CIRCUIT CONFIGURATION FOR CONTROLLING A BRAKE SYSTEM WITH (ANTI-LOCK CONTROL AND/OR TRACTION) SLIP CONTROL

BACKGROUND OF THE INVENTION

The present invention relates to a method for controlling a brake system with anti-lock control and/or traction slip control, wherein the wheel rotational behavior is measured and control signals are derived from the measured values by logical combining and by signal processing. The control signals regulate the wheel slip by decreasing, maintaining constant and increasing or re-increasing the braking pressure. A circuit configuration also is provided for implementing this method which generates control signals to switch multiple-way valves inserted into the pressure-fluid conduits of the brake system.

Brake systems with electronic anti-lock control are known. Systems for traction slip control by brake management also are known. The braking pressure in the wheel brakes of the controlled wheels typically is modulated by means of electromagnetically actuatable multiple-way valves which are inserted into the pressure-fluid conduits. The braking pressure is kept constant by closing these valves, braking pressure is decreased by opening a pressure fluid conduit to a pressure supply reservoir, while simultaneously the pressure-fluid inlet conduits are closed. In known so-called plunger-type brake systems, pressure decrease takes place by volume increase of a chamber connected to the wheel brake in which the pressure fluid is contained.

In present systems rapidly acting multiple-way valves with two or three switch positions are used, and the pressure modulation and/or the magnitude and the speed of the desired pressure variation in the wheel brake is achieved by pulsewise actuation of the valves and by variation of the number of pulses or the ratio between pulse duration and pulse pauses.

The measured values and information for braking pressure control and hence slip control are obtained in known systems exclusively with the aid of wheel sensors which generate electric signals indicative of the wheel rotational behavior. By logically combining the signals supplied by the individual wheel sensors, it is possible to determine the vehicle speed, vehicle deceleration and acceleration, etc. However, direct measurement of the braking pressure in the wheel brakes and/or in the braking pressure generator which could supply important information for brake slip control is not provided for reasons of cost. Thus, the control logic responds to the braking pressure and/or the pressure variation attained by actuation of the valves only from the wheel rotational behavior. Relatively long time periods for evaluation of the data, misinterpretations in certain situations and corresponding impairment of the control result from these known techniques.

It is a general object of this invention to improve the control quality without appreciable increase of manufacturing cost. More particularly, information for the control unit relating to the instantaneous braking pressure in the individual wheel brakes which is modulated by valve actuation is obtained without the use of additional sensors.

This object can be achieved in a method of the type referred to, wherein quantities determining the pressure in the wheel brakes are measured and assessed, and from these measured quantities a wheel pressure pattern which, by approximation, represents the pressure variation in the wheel brake is derived and utilized during wheel slip control and/or braking pressure control. A circuit configuration for implementing this method includes circuits, by means of which the quantities determining the pressure in the wheel brakes are measurable and assessable and which form a wheel pressure pattern. These circuits produce a signal which, by approximation, represents the pressure variation in the wheel brakes and which can be included in the signal processing for generating the braking pressure control signals.

SUMMARY OF THE INVENTION

According to the present invention, the desired information about the pressure variation is obtained by logically combining measured values and stored values, namely by virtue of the formation of a so-called wheel pressure pattern. Without pressure-measuring devices or other additional sensors, an approximate value is produced which is included in the control logic and which considerably improves the control.

According to a preferred embodiment of the inventive method, the intervals of excitation of valves in the pressure-fluid inlet conduits and/or outlet conduits of the wheel brakes are measured and integrated as quantities determining the pressure in the wheel brakes, while taking into consideration the braking-pressure-increase and braking-pressure-decrease characteristic curves of the wheel brakes or of the entire system and taking into consideration of a value representing, by approximation, the initial conditions and/or the initial pressure upon commencement of the control. This value can be derived for instance from the vehicle acceleration and/or from the wheel acceleration taking into consideration of the brake force distribution or axle load distribution. To determine the initial pressure, it is also possible to evaluate the time span between the application of the brake, determined for example by a signal of the brake light switch, and the commencement of the control.

A favorable embodiment of the circuit configuration of the present invention is that the braking-pressure-increase and the braking-pressure-decrease characteristic curves of the wheel brakes or of the entire system are memorized in the circuits as pressure-determining quantities.

Further, the periods of excitation of the multiple-way valves are measurable and assessable as quantities determining the pressure in an advantageous circuit configuration. To this end, an integrator is provided which forms the wheel pressure pattern as a function of the actuation signals of the multiple-way valves and determined by the pressure-decrease and pressure-increase characteristic curves and the initial conditions. Finally, the circuit configuration can be arranged such that values which approximately indicate the initial conditions and/or the initial pressure upon the commencement of the control are measurable and assessable as pressure-determining quantities.

BRIEF DESCRIPTION OF THE DRAWINGS

Further features, advantages and applications of this invention are described in the following description by way of the accompanying drawing in which:

FIG. 1 is a symbolic illustration of the brake system with anti-lock control and traction slip control in accordance with the present invention;

FIG. 2 is a pressure-increase and a pressure-decrease characteristic curve of a wheel brake;

FIG. 3 shows in a diagram as a function of time the actuation pulses given to an inlet valves (EV) and to an outlet valve in the pressure-fluid conduit of a wheel brake as well as the pressure variation caused thereby during a traction slip control action;

FIG. 4 shows in a similar illustration like in FIG. 2 the pressure-increase and pressure-decrease characteristic curves in the presence of varying brake force;

FIG. 5 shows the variation of the braking pressure during the pressure increase and pressure decrease; and, FIG. 6 is a block view of an embodiment of a circuit configuration according to this invention.

DETAILED DESCRIPTION OF THE INVENTION

Figure 6:
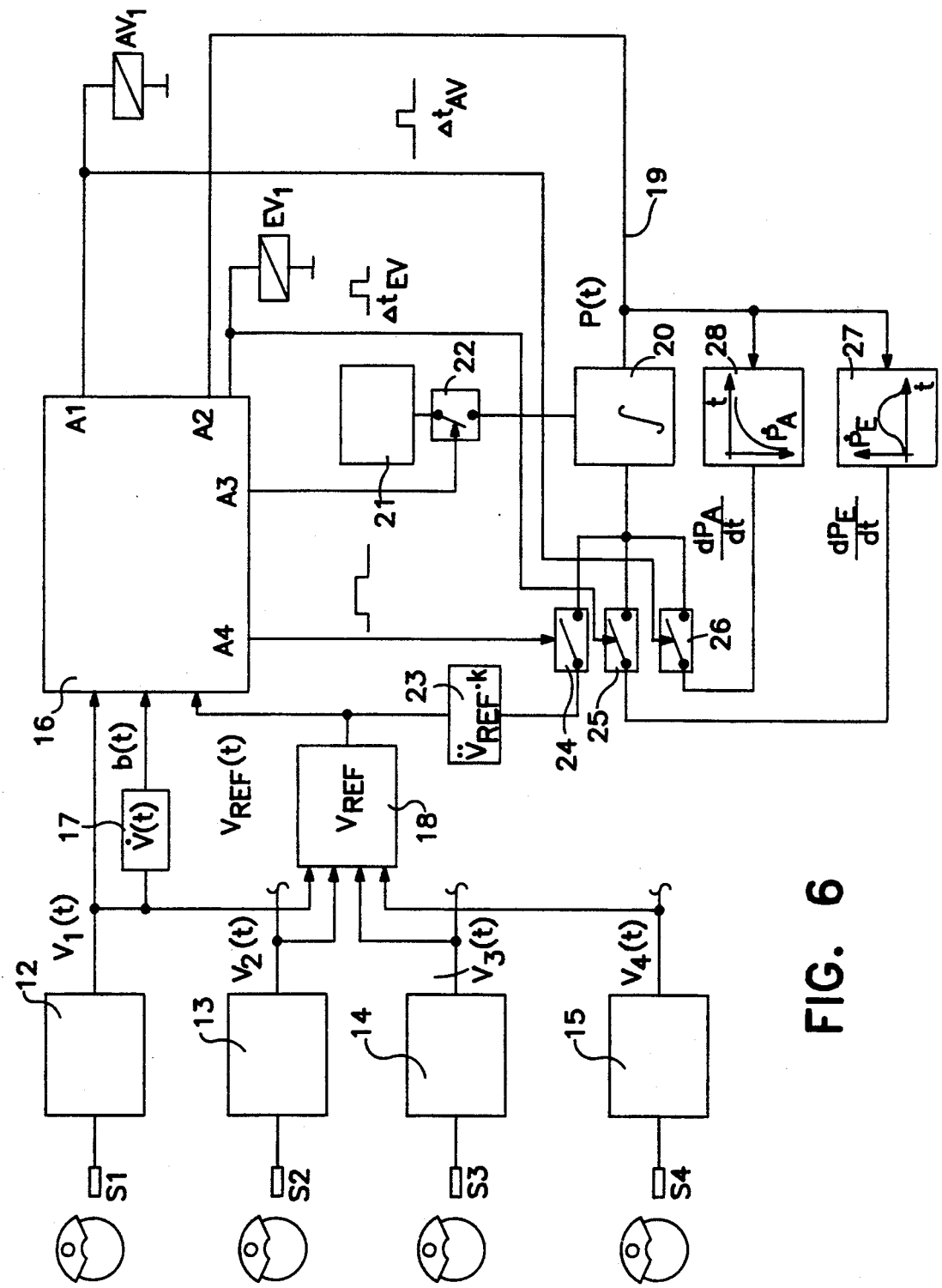

A brake system of the type shown in FIG. 1, in which the basic hydraulic components and the braking pressure control valves are shown is adaptable for implementing the method in accordance with the present invention.

This brake system comprises a pedal-operated braking pressure generator 1 of an auxiliary-pressure source 2, for example, an electromotively driven hydraulic pump, and of multiple-way valves 3 to 8. A braking pressure generator with two hydraulically isolated brake circuits I, II is provided. For the sake of clarity, the arrangement of the valves and the connection to the auxiliary pressure source in the second brake circuit II are not depicted.

The valve pairs 3, 5 and 4, 6 each provide for the individual modulation of the braking pressure in the connected wheel brake 10 and/or II of the front wheel VR and/or VL. Valves 3, 4 are inlet valves (EV) opened in their initial position, while the outlet valves (AV) 5 and 6 are normally closed. For pressure decrease, the inlet valves 3, 4 are closed, and pressure fluid out of the wheel brakes is discharged by way of the outlet valves 5, 6 into a pressure supply reservoir 9, from which the pressure fluid can then be returned into the brake circuits in a known fashion.

By means of the valves 7 and 8, the auxiliary-pressure source 2 instead of the braking pressure generator 1 can be connected to the wheel brakes. For instance, for traction slip control to which FIG. 3 is directed, the hydraulic pump of the auxiliary-pressure source 2 is put into operation, and pressure fluid is introduced by way of the valve 8 into the wheel brake of the imminently spinning wheel VR and/or VL. Change-over of the inlet valve 7 prevents discharge of pressure fluid by way of the braking pressure generator 1 in this control mode.

As is depicted in FIGS. 2, 4 and 5, the pressure and the pressure variation against time are not linear, but are dictated by specific characteristic curves which are dependent on the construction of the wheel brake and of parameters of the entire system. A typical filling curve, that is pressure-increase characteristic curve $P_E$ as well as a typical pressure-decrease characteristic curve $P_A$, are shown in FIGS. 2 and 4. Since the pressure build-up, more particularly the slip of the characteristic curve, likewise depends upon the force which is exerted by way of the pedal on the braking pressure generator 1, the curve $P_E$ in FIG. 2 only represents a mean value. In the presence of lower pedal force $P'_E$ and a higher pedal force $P''_E$, the pressure-increase characteristic curves $P'_E$ and $P''_E$ according to FIG. 4 will apply. A like dependency does not exist for the pressure-decrease characteristic curve $P_A$, since the pressure fluid is always discharged into a pressure supply reservoir 9 subject to atmospheric pressure by way of a completely opened outlet valve 5 or 6 in the pressure decrease period. The pressure-increase characteristic curve $P_E$ illustrated in FIG. 2 applies in that case to the supply of auxiliary pressure out of the source 2 when the braking pressure generator 1 is not actuated. This situation occurs during a traction slip control action.

The pressure variation as a function of the actuation of a pair of inlet and outlet valves EV, AV on the basis of the pressure-increase and pressure-decrease characteristic curves according to FIG. 2 during a traction slip control action (ASR) is shown in FIG. 3. In the initial period of time between $t_0$ and $t_1$, the pressure rise is relatively flat, while in the subsequent, relatively short periods of time $\Delta t_{EV2}$, $\Delta t_{EV3}$ and $\Delta t_{EV4}$ the steep range of the pressure-increase characteristic curve $P_E$ will become effective. Short-time opening of the outlet valve AV for the periods of time $\Delta t_{AV}$ causes a pressure decrease corresponding to the pressure-decrease characteristic curve $P_A$. Starting from the point of time $t_8$, the outlet valve AV is released completely despite the relatively flat slope of the pressure-decrease characteristic curve $P_A$.

The time-variation of the pressure during the pressure increase ($P_E$) and during the pressure decrease ($P_A$) is illustrated in FIG. 5.

According to the present invention, a wheel pressure pattern is formed for determining and evaluating the pressure in the wheel brakes 10, 11, which pattern represents by approximation the pressure variation in the wheel brakes. To this end, the intervals of excitation of the inlet and outlet valves 3 to 6 are determined and integrated relative to the pressure-increase and pressure-decrease characteristic curves. It is believed sufficient, for example, to approximate the pressure-increase characteristic curve $P_E$ according to FIG. 2 by three straight lines of different gradient, as is indicated in FIG. 2 by the straight lines G1, G2 and G3. A similar subdividing of the pressure-decrease characteristic curve $P_A$ also is possible.

While in the event of a traction slip control action according to FIG. 3, pressure does not prevail at the point of time $t_0$, in an anti-lock control action it is required to additionally consider the initial conditions, namely the pressure upon the commencement of anti-lock control and/or upon actuation of the valve pairs EV/AV. In accordance with the present invention, a value representative of the initial pressure is determined from various criteria, among others from the vehicle deceleration upon the commencement of anti-lock control, from the period of time between the application of the brake and the commencement of the control and from other criteria, and this value then is taken into account for the control and/or the calculation.

FIG. 6 shows a circuit configuration for implementing the method in accordance with the present invention. It consists of the following steps: The rotational behavior of the individual vehicle wheels is ascertained by way of sensors S1 to S4. The output signal of these sensors is first of all processed by way of trigger circuits, transducers and the like which are symbolized by the circuits 12 to 15. The output signals of these circuits which represent the respective wheel speeds $v_1(t)$ to $v_4(t)$ are delivered further to a control logic 16. Further, differentiation of the wheel speed provides the deceleration and/or acceleration (b(t)) by means of differentiators 17 (the corresponding similar block units for the processed sensor signals S2 to S4 have not been shown for clarity). The corresponding signals also are fed to the control logic 16. Finally, comparing and logically combining of the wheel-speed signals in a reference circuit 18 derives the so-called reference speed which, as a reference quantity, likewise is required for determining the wheel slip and, respectively, the rotational behavior of the individual wheels.

The outputs A1 and A2 of the control logic 16 lead directly to the inlet and outlet valve pair $EV_1/AV_1$ of a wheel that is controllable individually or jointly with other wheels. The signal representative of the pressure variation p(t) and/or the wheel pressure pattern is supplied to the output of an integrator 20 and is introduced into the control logic 16 by way of a signal path 19. When driving normally, signalled to the control logic 16 by way of an output A3, are specific start conditions or initial conditions which are maintained by way of the circuit 21. After a control action, the integrator is reset via the circuit 21 into its initial position.

On the other hand, normal braking, that is, without slip control, is signalled to the control logic 16 by way of the output A4. By way of a differentiating circuit 23 and a switch 24, a signal representative of the change in the vehicle deceleration is processed in the integrator 20. In the present case, the second time derivative $V_{REF}$ is evaluated after being multiplied with the factor k, which latter factor among others depends on the axle load distribution, for determining the integrator contents and thus for determining, for example, the initial pressure upon the commencement of a control action.

In the embodiment described herein, the commencement of an anti-lock control is derived from the actuating signals of the outlet valves and inlet valves $AV_1$ and/or $EV_1$ supplied to the outputs A1, A2 of the control logic 16. Actuation of the valves $EV_1/AV_1$ results in the switches 25, 26 closing for the duration of the valve-actuating signals and, thereby, in the delivering of the pressure-differential quotients $dP_E/dt$ and/or $dP_A/dt$ to the input of the integrator 20, the quotients being formed in the differentiators 27 and 28, respectively. In this manner, with the aid of the integrator 20, a wheel pressure pattern is formed of the intervals of excitation of the inlet and outlet valves relative to the braking-pressure-increase and braking-pressure-decrease characteristic curves which are memorized in the differentiators 27, 28, and relative to the initial conditions which are introduced by way of the stage 23 and the switch 24, and corresponding information is fed back to the control logic by way of the signal line 19. The output of the integrator 20 always produces an image of the pressure prevailing in the associated wheel brake or in the brake system and thus an important information input to the anti-lock or traction slip control and, respectively, for adjusting a braking pressure that is optimal for the desired control.

We claim:

1. A vehicle brake system with anti-lock control or traction slip control comprising:
    a plurality of brakes;
    a pressure fluid reservoir;
    fluid lines through which pressure fluid is conducted between said reservoir and said brakes;
    inlet and outlet valves in said fluid lines which are selectively opened and closed to regulate the flow of pressure fluid to and from said brakes;
    sensor means for sensing the rotational behavior of a plurality of wheels individually associated with said brakes and for producing sensor signals representative of said rotational behavior of said wheels;
    circuit means responsive to said sensor signals for:
        (a) assessing and processing said sensor signals,
        (b) developing valve control signals representative of the time intervals during which said inlet and outlet valves are opened and closed,
        (c) supplying normal driving signals representative of the pressure of said pressure fluid during normal driving of the vehicle, and
        (d) supplying normal braking signals representative of the change in vehicle deceleration during normal braking of the vehicle to establish the initial pressure upon the commencement of a control action;
    means for conducting said valve control signals to said inlet and outlet vales to selectively open and close said inlet and outlet valves and regulate pressure fluid conducted to and from said brakes;
    first differentiator means for storing the derivative of a pressure increase characteristic curve determined from selected parameters of the vehicle;
    second differentiator means for storing the derivative of a pressure decrease characteristic curve determined from said selected parameters of the vehicle; and
    integrator means selectively connected to said first differentiator means, said second differentiator means and said circuit means and responsive to:
        (a) said valve control signals during time periods when said inlet and outlet valves are open,
        (b) said normal driving signals, and
        (c) said normal braking signals, for:
        (a) developing a pressure control signal,
        (b) supplying said pressure control signal to said first differentiator means and said second differentiator means to differentiate said pressure control signal, and
        (c) supplying said pressure control signal to said circuit means to control the timing and duration of said valve control signals.

2. A circuit configuration as claimed in claim 1, wherein said pressure increase characteristic curve is estimated by three straight lines each having a different slope.

3. A circuit configuration as claimed in claim 1, wherein said pressure increase characteristic curve is estimated at a mean braking force.

* * * * *

UNITED STATES PATENT AND TRADEMARK OFFICE
CERTIFICATE OF CORRECTION

PATENT NO. : 5,207,484
DATED : May 4, 1993
INVENTOR(S) : Hans W. Bleckmann et al.

It is certified that error appears in the above-indentified patent and that said Letters Patent is hereby corrected as shown below:

Col. 5, line 34, delete "$V_{REF}$" and insert therefor --$\ddot{V}_{REF}$--;

Claim 1, Col. 6, line 31, delete "vales" and insert therefor --valves--.

Signed and Sealed this

Eleventh Day of January, 1994

Attest:

BRUCE LEHMAN

*Attesting Officer*   Commissioner of Patents and Trademarks